United States Patent
Kusase et al.

(10) Patent No.: US 6,208,060 B1
(45) Date of Patent: Mar. 27, 2001

(54) STATOR OF VEHICLE AC GENERATOR AND METHOD OF MANUFACTURING THE SAME

(75) Inventors: Shin Kusase, Obu; Atsushi Umeda, Okazaki; Tsutomu Shiga, Nukata-gun, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/315,984

(22) Filed: May 21, 1999

(30) Foreign Application Priority Data

May 25, 1998 (JP) .................................................. 10-143008
Jul. 15, 1998 (JP) .................................................. 10-200554

(51) Int. Cl.⁷ ............................... H02K 1/00; H02K 1/12
(52) U.S. Cl. .......................... 310/254; 310/201; 310/216
(58) Field of Search ..................................... 310/179–180, 310/195, 201, 203, 208, 214, 215, 254, 258, 260, 216; 29/596–598

(56) References Cited

U.S. PATENT DOCUMENTS

| 1,822,261 | 9/1931 | Apple ................................. 310/168 |
| 1,826,295 | * 10/1931 | Apple ................................. 310/201 |
| 2,928,963 | 3/1960 | Bertsche et al. ...................... 310/168 |
| 4,876,473 | * 10/1989 | Tanaka et al. ....................... 310/216 |
| 5,097,167 | 3/1992 | Kanayama et al. .................. 310/201 |
| 5,663,601 | * 9/1997 | Wakabayashi et al. ................ 310/45 |
| 5,949,173 | * 9/1999 | Wille et al. ........................... 310/220 |
| 5,982,073 | * 11/1999 | Lashmore et al. .................... 310/254 |

FOREIGN PATENT DOCUMENTS

| 760 402 | 3/1954 | (DE) . |
| 1194085 | 6/1970 | (GB) . |
| 50-47102 | 4/1975 | (JP) . |
| 62-272836 | 11/1987 | (JP) . |
| 63-274335 | 11/1988 | (JP) . |
| 64-5340 | 4/1991 | (JP) . |
| 4-17539 | 1/1992 | (JP) . |
| 8-205441 | 8/1996 | (JP) . |
| 92/06527 | 4/1992 | (WO) . |
| 97/40567 | 10/1997 | (WO) . |

OTHER PUBLICATIONS

Patent Abstracts of Japan vol. 006, No. 067 (E–104), Apr. 28, 1982 & JP 57 009244 A (Toshiba Corp), Jan. 18, 1982.
Patent Abstracts of Japan vol. 097, No. 011, Nov. 28, 1997 & JP 09 191614 A (Takamori:KK), Jul. 22, 1997.

* cited by examiner

Primary Examiner—Tran Nguyen
(74) Attorney, Agent, or Firm—Pillsbury Winthrop LLP (57) ABSTRACT

A stator of an ac generator for vehicle has a stator core which is a lamination of steel sheets and has a plurality of slots cut out in a cutout direction. A plurality of insulators and, subsequently, electric conductors are respectively inserted into the plurality of slots in the direction opposite to the cutout direction. The insulators are prevented from shifting in the slots by sharp-edged burs provided when the plurality of slots are cut out.

10 Claims, 10 Drawing Sheets

STATOR OF VEHICLE AC GENERATOR AND METHOD OF MANUFACTURING THE SAME

CROSS REFERENCE TO RELATED APPLICATION

The present application is based on and claims priority from Japanese Patent Applications Hei 10-143008 filed on May 26, 1998 and Hei 10-200554 filed on Jul. 15, 1998, the contents of which are incorporated herein by reference.

BACKGROUND OF THE INVENTION

1. Field of the Invention

The present invention relates to a stator of a vehicle ac generator driven by an internal combustion engine and a method of manufacturing the same.

2. Description of the Related Art

It is known that a plurality of conductor segments are welded to form a stator winding. WO92/06527 discloses a stator winding which is formed of a plurality of U-shaped conductor segments. The U-shaped conductor segments are inserted from an axial end of the stator core and connected to one another at portions thereof on the other end of the stator core, so that the stator can have regularly disposed coils more easily than the stator having a stator winding formed of continuously wound magnet wires.

Although WO92/06527 has no description about insulators disposed in the slots, such electric insulators are sometimes necessary under certain circumstances. If an insulator is formed of a plain insulating sheet, such an insulator may be dragged or shifted axially in a slot when a conductor segment is inserted into the slot covered by the insulator. As a result, bare surfaces of the stator can not be covered completely, and the conductor segments are not insulated well. If the insulators are fixed to the stator core by an adhesive agent or the like, additional steps and cost are necessary.

SUMMARY OF THE INVENTION

Therefore, the object of the invention is to provide a stator of a vehicle ac generator in which the insulators are prevented from moving to ensure good insulation performance.

According to a main feature of the invention, a stator core of an ac generator for vehicle is formed of a lamination of a plurality of steel sheets and a plurality of slots are cut out from the steel sheets in a cutout direction to provide burs projecting in the cutout direction. A plurality of deformable insulation sheets are inserted into the plurality of slots first, and a plurality of electric conductors are inserted into the plurality of slots in the direction opposite to the cutout direction. Because sharp edges of the burs are formed to extend in the cutout direction, insulators are impeded by sharp edges of the burs when the conductor segments are inserted into the slots in the direction opposite to the cutout direction. This ensures good insulation performance between the stator core and the conductor segments.

According to another feature of the invention, each of the electric conductors has a U-turn portion at the front end of the stator core in the cutout direction. Therefore, the insulators can be prevented from moving when the conductor segments are inserted.

According to another feature of the invention, each of the insulators has a folded lip disposed at the front end thereof in the cutout direction. The insulators can be surely prevented by the folded lips from shifting axially when the conductor segments are inserted. Each of the insulators can have the folded lip at the back end thereof in the slot-cutout direction. In this case, the folded lips protect the insulators from damage when coil ends are press-formed. When coil ends are formed, the insulators are pulled or pushed excessively between the conductor segments and the stator core. However, the folded lip prevents the insulator from being damaged.

According to another main feature of the invention, a method of manufacturing a stator core of a vehicle ac generator comprises a first step of forming a lamination of steel sheets, a second step of cutting a plurality of slots from the lamination in a cutout direction, a third step of inserting insulators into the slots, a fourth step of inserting conductor segments into the slots covered by the insulators in the direction opposite the cutout direction, and fifth step of connecting the conductor segments inserted into the slots to one another. Therefore, the insulators are held still by sharp edges of the burs when the conductor segments are inserted.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

An embodiment of the present invention is described with reference to the appended drawings.

Figure 1:
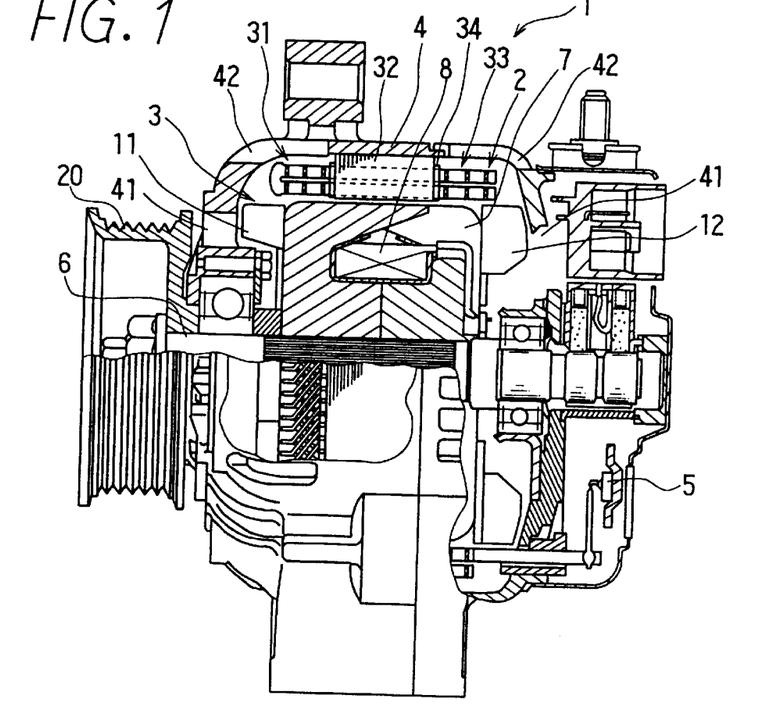
FIG. 1 is a cross-sectional view illustrating an ac generator for a vehicle according to an embodiment of the invention.

In FIG. 1, an ac generator 1 having a stator according to the invention includes rotor 3, frame 4, rectifier 5, etc. Stator 2 is composed of stator core 32, a plurality of conductor segments 33 and a plurality of insulators 34. Stator core 32 is a lamination of a plurality of steel sheets, which has a number of slots formed inside thereof. The plurality of conductor segments 33 project from opposite ends of stator core 32 to form coil ends 31 and connected to one another to form a stator winding.

Rotor 3 has field coil 8, a pair of front and rear pole cores 7 and shaft 6. Front and rear pole cores 7 respectively have six claw pole pieces extending axially to enclose field coil 8. Field coil 8 has a cylindrical body covered by an insulation-coating. Axial flow type cooling fan 11 is welded to the front side pole core 7. Cooling fan 11 blows cooling air in the radial and axial direction from the front side thereof. Centrifugal cooling fan 12 is welded to the rear side pole core 7 to blow cooling air radially outward from the rear side thereof.

Frame 4 accommodates stator 2 and rotor 3 and supports rotor 3 to rotate along with shaft 6. Stator 2 is fixed to frame 4 around the pair of pole cores 7 at a certain gap therefrom. Frame 4 has air discharge vents 42 at portions opposite coil ends 31 of stator 2 and air intake vents 41 at the axial ends thereof.

AC generator 1 described above is rotated in a certain direction by an engine (not shown) via a belt and a pulley 20. When field coil 8 is energized by an outside power source, each of the pole pieces is excited, so that the stator winding can provide three-phase ac voltage. Thus, rectifier 5 provides a certain amount of dc current at the output terminals.

Figure 2:
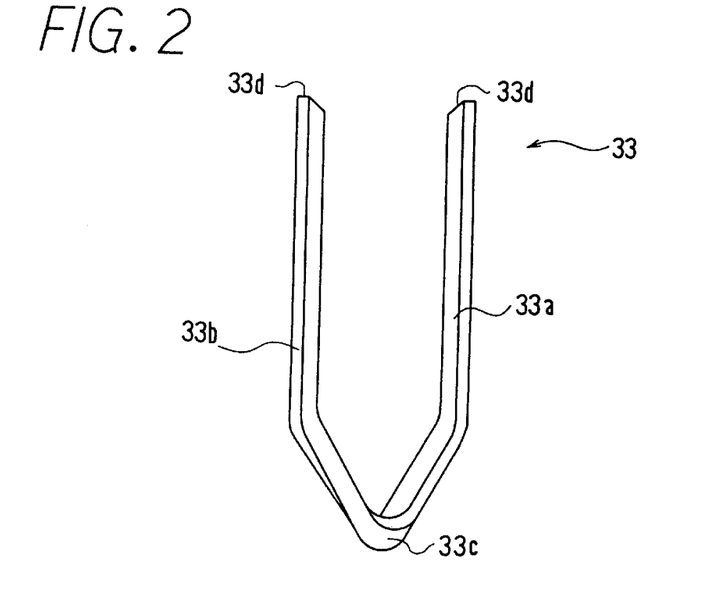
FIG. 2 is a perspective view of a conductor segment forming a part of stator winding of a stator according to a first embodiment of the invention.

As illustrated in FIG. 2, conductor segments 33 is a U-shaped member made of conductive metal (e.g. copper) bar or plate which has U-turn portion 33c. Conductor segment 33 has inner conductor portion 33a, outer conductor portion 33b and U-turn portion 33c disposed between inner and outer conductor portions 33a, 33b. Each of radially inner conductor portions 33a has straight inner portion disposed in the radially inner layer of the winding, and each of outer conductor portions 33b is disposed in the radially outer layer of the winding.

Figure 3:
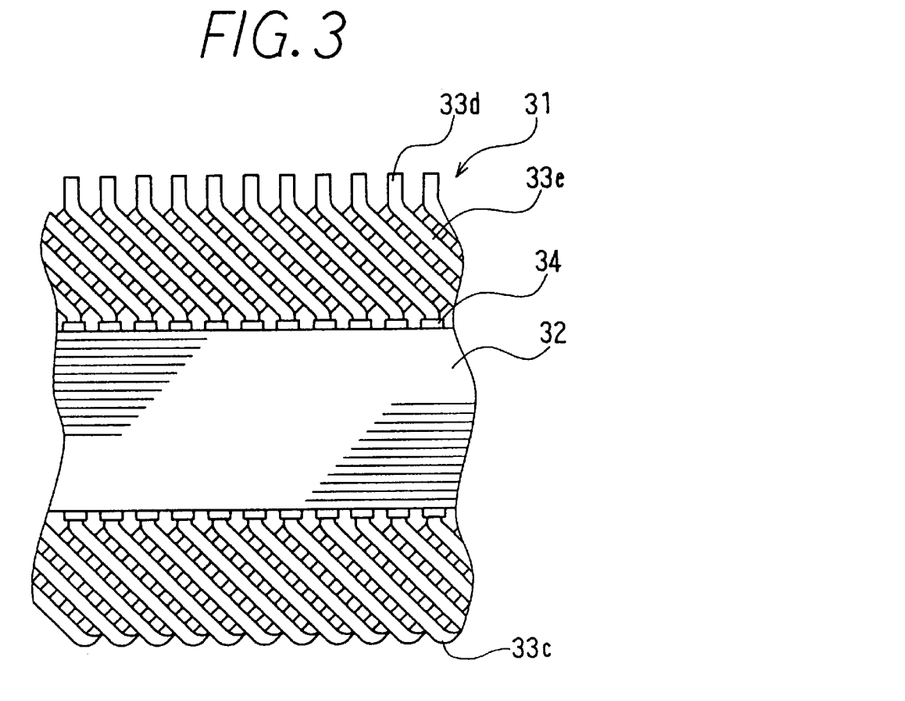
FIG. 3 is a fragmentary side view of the stator according to the first embodiment.

As illustrated in FIG. 3, U-turn portions 33c are disposed at one axial end of stator core 32, and have slant portions 33e forming coil ends 31 at the other axial end of stator 2. Slant portions 33e of conductor segments 33 in the radially outer layer of the stator winding extend in one direction. On the other hand slant portions 33e in the radially inner layer of the stator winding extend in the other direction. Straight ends 33d of conductor segments 33 are welded by ultrasonic wave welder or arc welder, or are soldered or mechanically connected.

Figure 4:
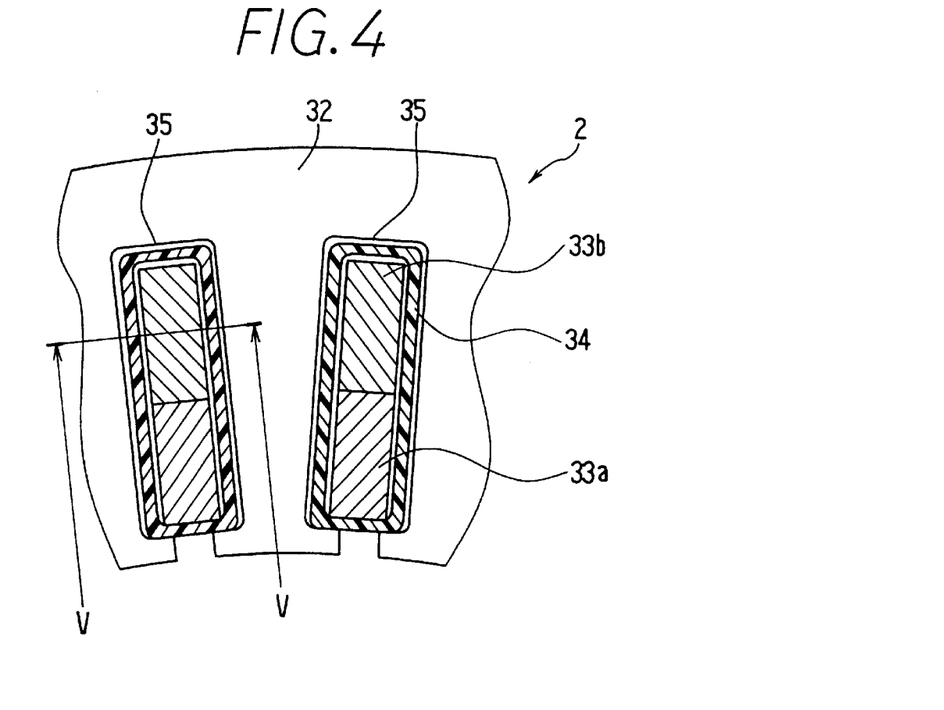
FIG. 4 is a fragmentary cross-sectional view of the stator shown in FIG. 3.

A pair of conductor segments 33 is disposed in each one of slots 35 and is connected one another. As illustrated in FIG. 4, inner and outer conductor portions 33a, 33b of each of conductor segments 33 has rectangular cross-section with circumferential sides being longer than its radial sides. Conductor segments 33 are coated with insulation film to insulate one segment from another. Insulators 34 insulate each of conductor segments from the inner surface of slots 35.

Figure 5:
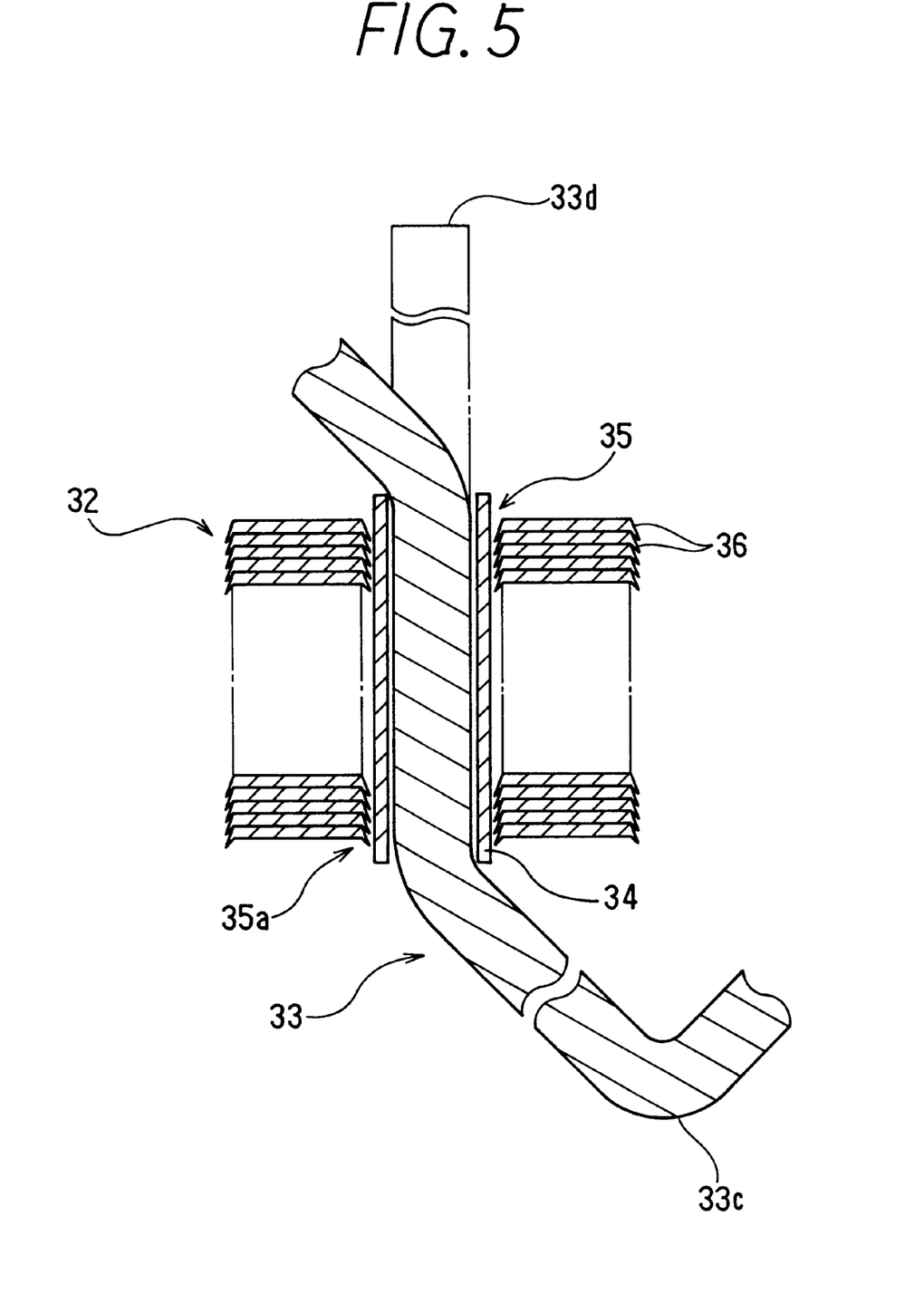
FIG. 5 is a cross-sectional view of the stator shown in FIG. 4 cut along line V—V.
Figure 6:
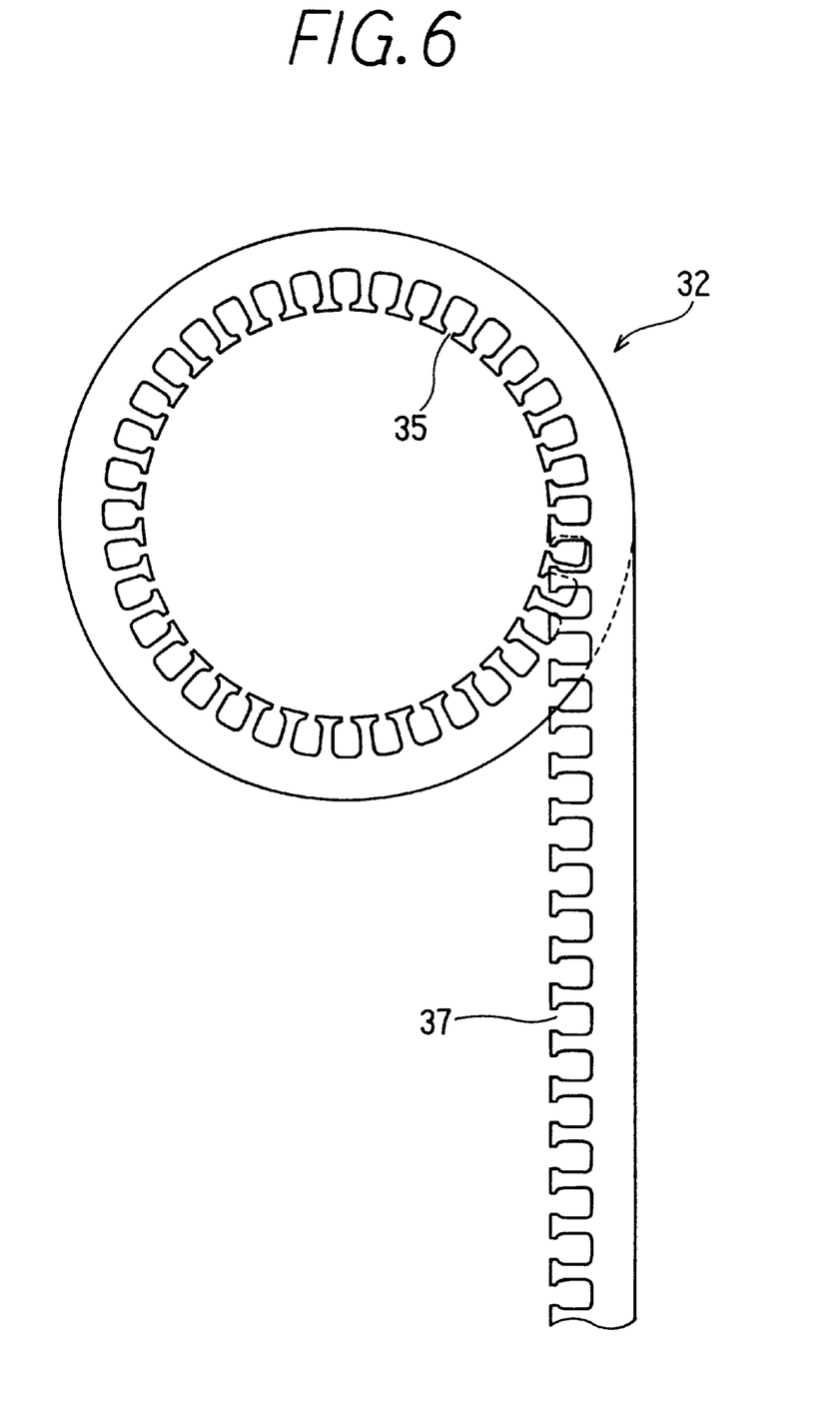
FIG. 6 is an illustration of forming a laminated stator core of steel sheets.

Stator core 32 is a lamination of a spirally-wound belt-like steel sheet 36 as shown in FIG. 6. A plurality of concavities 37 are cut out from a belt-like steel plate in the direction to form a plurality of slots 35 with sharp-edged burs 35a projecting in the cutout direction. In FIG. 5, U-turn portions 33c are disposed on the front end of the stator core in the cutout direction. Each of conductor segments 33 has side surfaces extending in parallel with the inner wall of slot 35, thereby providing a high space factor of conductor segments 33.

Figure 7:
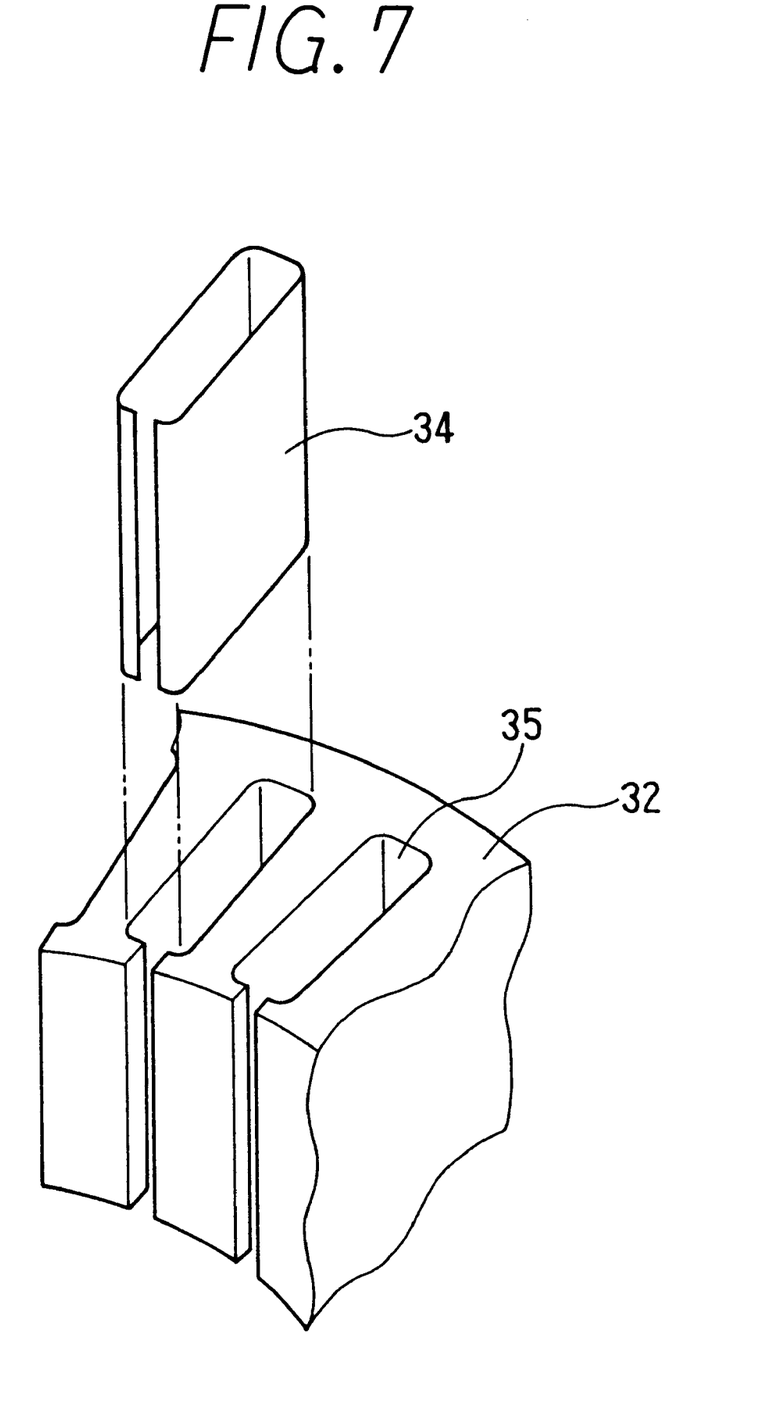
FIG. 7 is a perspective view illustrating an insulator being inserted into a slot of the stator according to the first embodiment.

As shown in FIG. 7, insulator 34 is made of an insulation sheet. The insulation sheet is formed to fit the inner periphery of each of slots. Preferably, each of insulators 34 is inserted into one of slots 35 from the back end of the stator core in the cutout direction, so that insulators 34 can be inserted smooth into slots 35.

Figure 8:
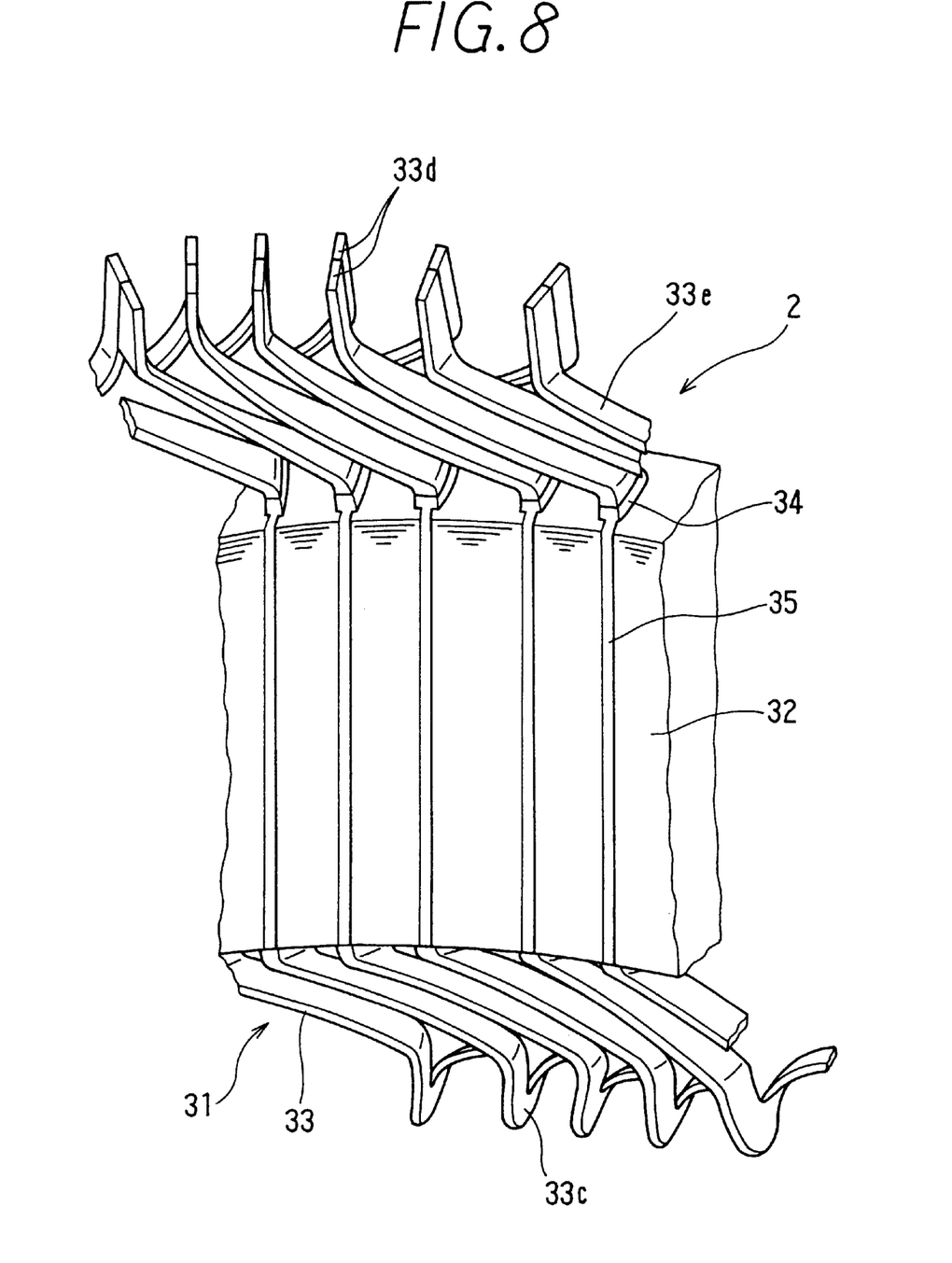
FIG. 8 is a perspective view illustrating coil ends on both ends of the stator according to the first embodiment.

After each of insulators 34 is inserted to one of slots 35, a number of U-shaped conductor segments 33 are lined up so that U-turn portions 33c can be disposed at the front end of stator core 32 in the cutout direction. As shown in FIG. 4, outer conductor portions 33b are inserted into the outside layer of slots 35, and inner conductor portions 33a are inserted into the inside layer of slots 35 that is covered by insulators 34. Each of conductor segments 33 is made of a U-shaped copper plate and is press-fitted into one of slots 35 so that opposite surfaces of outer and inner conductor portions 33b, 33a can fit the parallel walls of slot 35 via insulator 34. Accordingly, sharp edges of burs 35a catch insulators 34 and impede the same to move along the conductor segments 33. Thereafter, two straight ends 33d of each of conductor segments 33 are bent in the opposite directions respectively to connect to respective straight ends 33d extending from different layers of different slots 35 as shown in FIG. 8.

Figure 9:
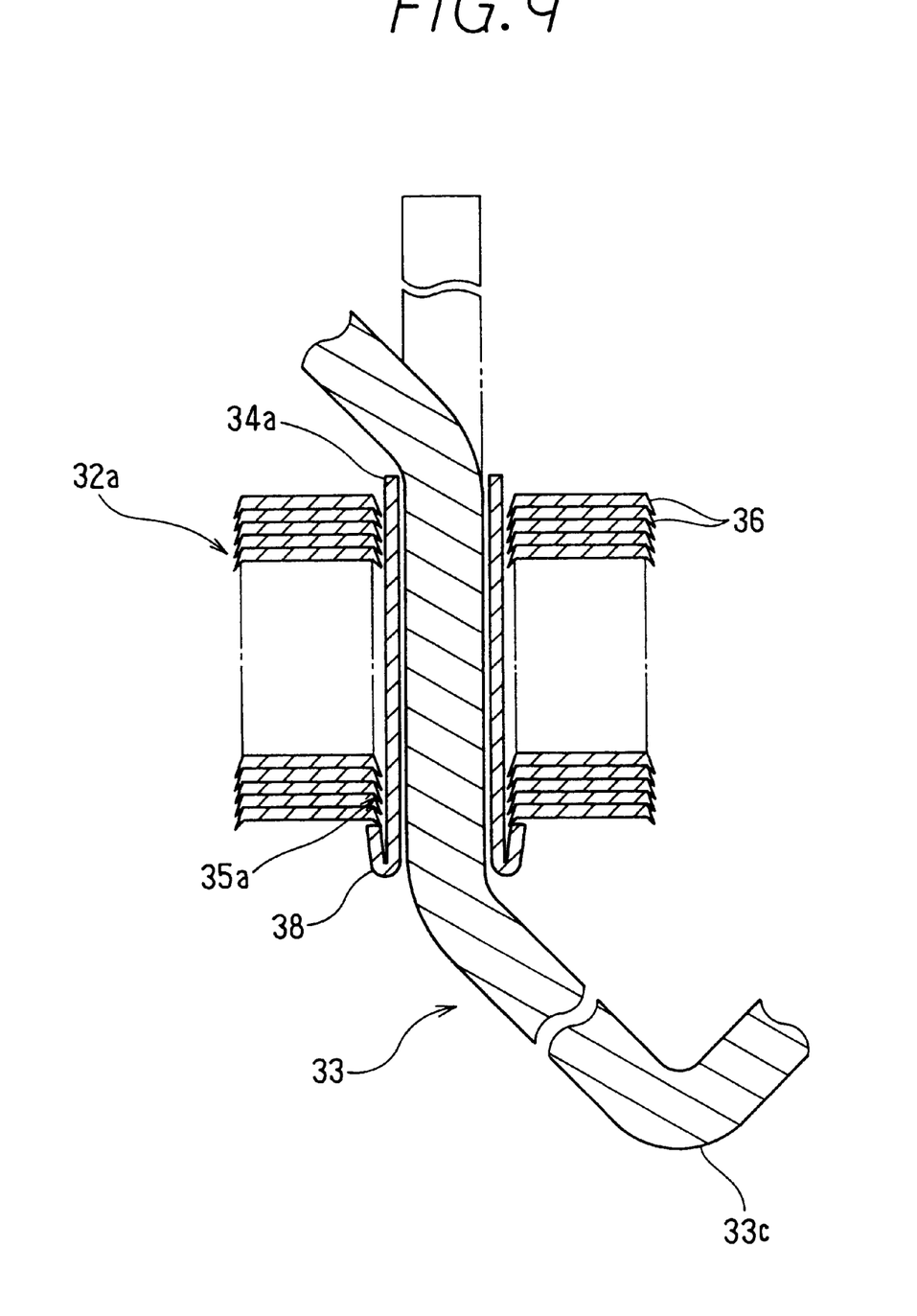
FIG. 9 is a fragmentary cross-sectional view of the stator according to the first embodiment having an insulator with folded lip at an end thereof.

As a variation such as shown in FIG. 9, insulator 34a can have a folded lip 38 as a stopper at one end. Folded lip 38 is disposed at the end of stator core 32 toward U-turn portion 33c and the front end in the slot-cutout direction. Insulators 34a are inserted into slots 35 so that folded lips 38 can engage the front end of stator core 32 in the cutout direction, and conductor segments 33 are subsequently inserted into slots 35. Accordingly, the insulators 34a can be held by folded lips as well as burs 35a at the correct axial position.

Figure 10:
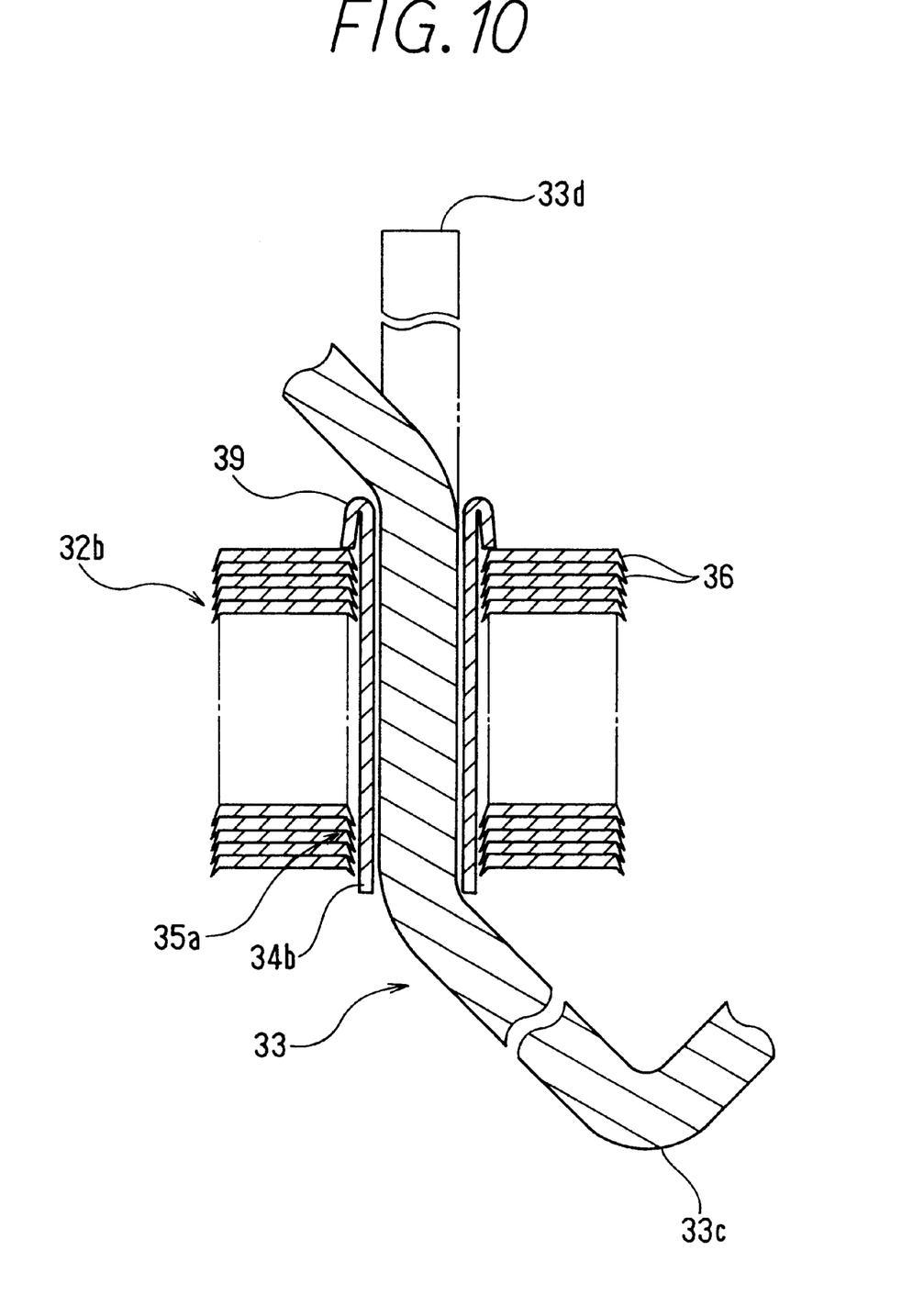
FIG. 10 is a fragmentary cross-sectional view of a variation of the stator according to the first embodiment having an insulator with folded lip at the other end thereof.

In another variation shown in FIG. 10, each of insulators 34b are inserted from the back end of the stator core with folded lips 39 on the back end in the cutout direction. On the other hand, conductor segments 33 are inserted in the opposite direction. Accordingly, insulators 34b are reinforced by folded lips 39 and prevented from being damaged when segment ends 33d are bent to form coil ends as illustrated in FIG. 10.

Folded lip 39 can be substituted by other equivalent expanded structure for positioning the insulator such as a flared lip.

Figure 11:
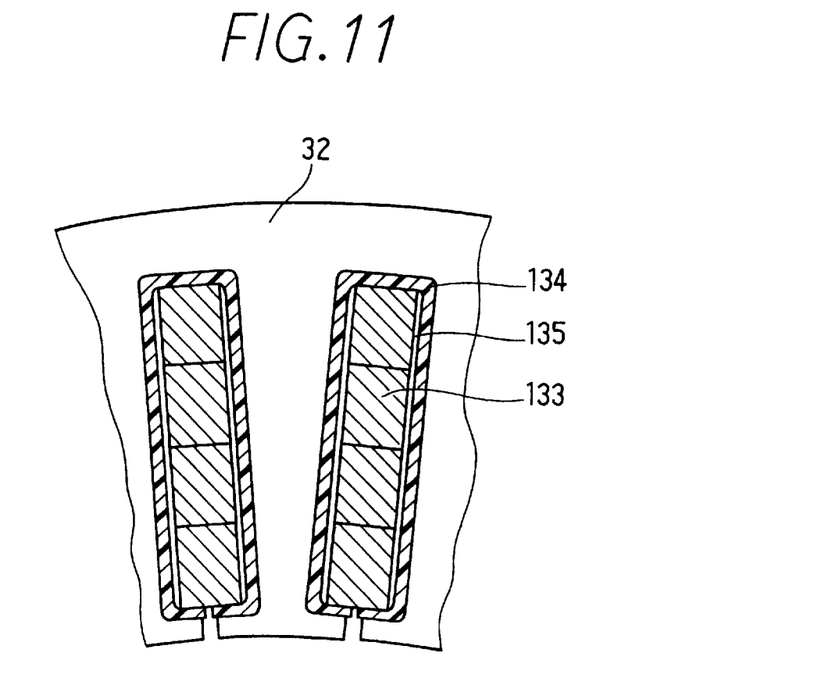
FIG. 11 is a fragmentary cross-sectional view of a stator according to a second embodiment of the invention.
Figure 12:
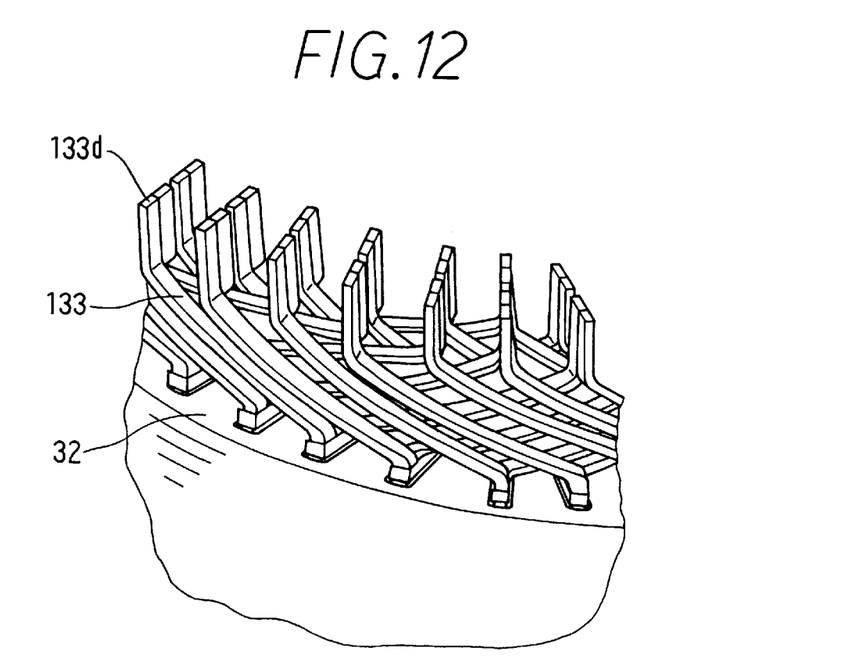
FIG. 12 is a fragmentary perspective view of the stator according to the second embodiment.

The number of conductor segments in each slot can be increased in the above described embodiment. As shown in FIG. 11, a stator according to a second embodiment of the invention has four conductor segments 133, which are lined up in the radial direction in each of slots 135. Conductor segments 133 are connected in the manner illustrated in FIG. 12. Each of four conductor segments 133 extends from one of slots 135 in an alternately different direction. Conductor segments 133 on this side of FIG. 12 extend clockwise and those on the opposite side extend counterclockwise. End portion 133d of one conductor segment 133 is connected to end portion 133d of another conductor segment 133 spaced apart at a certain pitch. Conductor segments 133 in the innermost layer are connected to those in the second inner layer, and conductor segments in the third layer are connected to those in the outermost layer.

Figure 13:
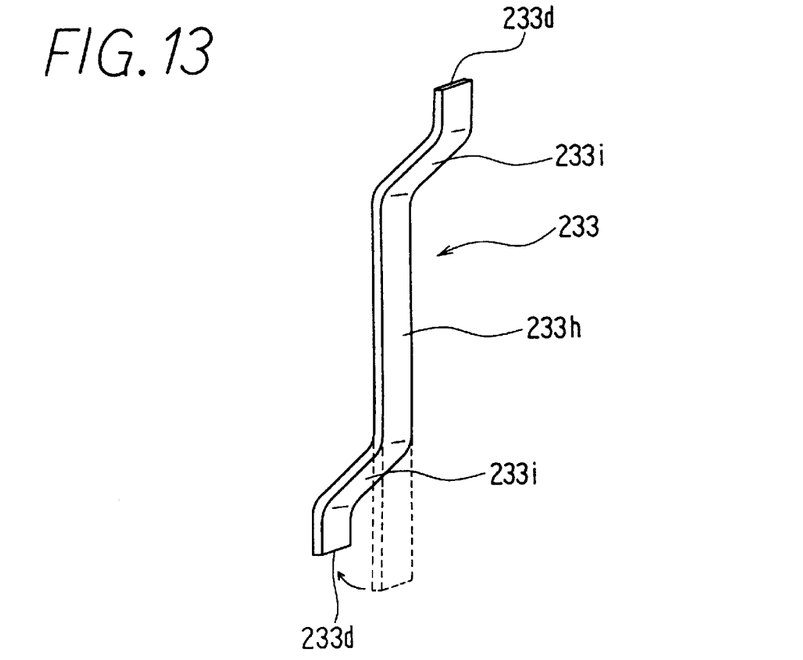
FIG. 13 is a perspective view illustrating a variation of conductor segment having no U-turn portion.
Figure 14:
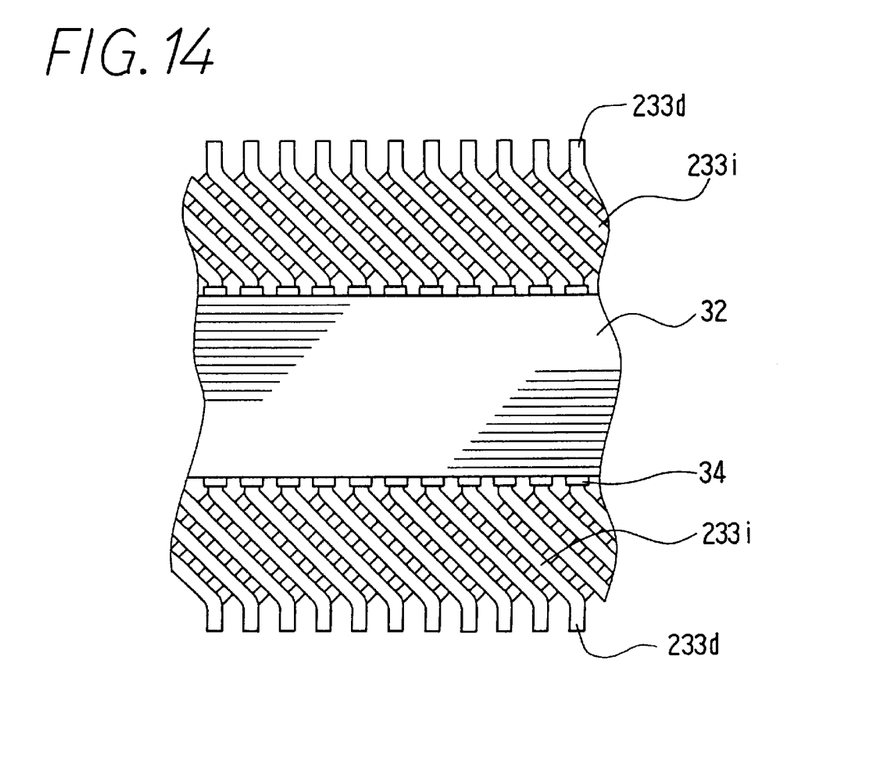
FIG. 14 is a side view of a stator according to a third embodiment having the conductor segments shown in FIG. 13.

A stator according to a third embodiment of the invention has a pair of I-shaped or J-shaped conductor segments 233, as shown in FIG. 13, instead of U-shaped conductor segments 33. Each of conductor segments 233 has straight inner conductor portion 233h and two straight outer portions 233i extending outward from opposite ends of inner conductor portions 233h. One of outer conductor portions 233i is bent from the dotted state shown in FIG. 13. Each of conductor segments is welded after they are assembled. As shown in FIG. 14, opposite end portions 233d of one conductor segment 233 are connected to end portions 233d of another conductor segment 233 disposed in another slot to form a stator winding. Conductor segments 233 are simple in shape and easy to manufacture. Because each of conductor segments 233 corresponds to one of insulators 34, it is easy to insert insulators 34 and conductor segments 233 into slots 35.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A stator of an ac generator for vehicle comprising a stator core having a plurality of slots, a plurality of conductor segments disposed in said plurality of slots, and a plurality of insulators disposed between inner peripheries of said slots and said plurality of conductor segments, wherein said stator core comprises a lamination of steel sheets having said plurality of slots with burs projecting from each of said steel sheets in a cutout direction, and said conductor segments have portions inserted into said plurality of slots in the direction opposite to said cutout direction so that said burs can catch said insulators when said conductor segments are moved in the direction opposite to said cutout direction.

2. The stator as claimed in claim 1, wherein
each of said conductor segments has a U-turn portion at the end of said stator core in said cutout direction.

3. The ac generator as claimed in claim 1, wherein
each of said insulators has a lip disposed at the front end thereof in said cutout direction.

4. The ac generator as claimed in claim 1, wherein
each of said insulators has a lip at the back end thereof in said cutout direction.

5. The ac generator as claimed in claim 1, wherein
each of said conductor segments has side surfaces extending in parallel with inner walls of said slots.

6. A stator of an ac generator for vehicle comprising a stator core having a plurality of slots, a plurality of U-shaped conductor segments disposed in said plurality of slots, and a plurality of insulators disposed between inner peripheries of said slots and said plurality of conductor segments, wherein said stator core comprises a lamination of steel sheets having said plurality of slots with burs projecting from each of said steel sheets in a cutout direction, and said conductor segments have U-shaped portions disposed on a front end of said stator core in said cutout direction so that said burs can catch said insulators when said conductor segments are moved in the direction opposite to said cutout direction.

7. The ac generator as claimed in claim 6, wherein
each of said insulators has a lip at the front end thereof in said cutout direction.

8. The ac generator as claimed in claim 6, wherein
each of said insulators has a lip at the back end thereof in said cutout direction.

9. The ac generator as claimed in claim 7, wherein
each of said conductor segments has side surfaces extending in parallel with inner walls of said slots.

10. The ac generator as claimed in claim 8, wherein
each of said conductor segments has side surfaces extending in parallel with inner walls of said slots.

* * * * *